(12) United States Patent
Garland

(10) Patent No.: US 11,966,941 B1
(45) Date of Patent: Apr. 23, 2024

(54) DENTAL TRAY AND ARTICULATOR

(71) Applicant: James K. Garland, Salt Lake City, UT (US)

(72) Inventor: James K. Garland, Salt Lake City, UT (US)

( * ) Notice: Subject to any disclaimer, the term of this patent is extended or adjusted under 35 U.S.C. 154(b) by 41 days.

(21) Appl. No.: 17/678,697

(22) Filed: Feb. 23, 2022

Related U.S. Application Data

(62) Division of application No. 16/746,918, filed on Jan. 19, 2020, now Pat. No. 11,364,100.

(51) Int. Cl.
  *A61C 11/02* (2006.01)
  *A61C 13/34* (2006.01)
  *G06F 16/21* (2019.01)
  *G06Q 30/0226* (2023.01)

(52) U.S. Cl.
  CPC .......... *G06Q 30/0226* (2013.01); *A61C 11/02* (2013.01); *A61C 13/34* (2013.01); *G06F 16/211* (2019.01)

(58) Field of Classification Search
  CPC ..... A61C 11/02; A61C 11/022; A61C 11/025; A61C 11/027
  See application file for complete search history.

(56) References Cited

U.S. PATENT DOCUMENTS

| | | | | |
|---|---|---|---|---|
| 4,163,319 A | * | 8/1979 | Ouaknine | A61C 11/082 433/64 |
| 4,252,523 A | * | 2/1981 | Gayso | A61C 11/02 433/60 |
| 4,459,107 A | * | 7/1984 | Weissman | A61C 9/00 433/213 |
| 4,553,936 A | * | 11/1985 | Wang | A61C 9/0006 433/229 |
| 4,602,905 A | * | 7/1986 | O'Keefe, III | A61C 9/0006 433/41 |
| 4,842,242 A | * | 6/1989 | Huffman | A61C 13/0027 264/17 |
| 4,865,544 A | * | 9/1989 | Scruggs | A61C 11/02 433/64 |
| 5,207,574 A | * | 5/1993 | Garland | A61C 9/002 433/213 |
| 5,425,636 A | * | 6/1995 | Ghim | A61C 9/002 433/64 |
| 5,482,460 A | * | 1/1996 | Farnor, Jr. | A61C 11/02 433/64 |
| 5,658,143 A | * | 8/1997 | Kuperman | A61C 9/002 433/74 |
| 5,769,634 A | * | 6/1998 | Choi | A61C 11/027 433/64 |
| 5,846,076 A | * | 12/1998 | Garland | A61C 9/00 433/57 |
| 6,019,601 A | * | 2/2000 | Cho | A61C 13/0027 433/34 |
| 6,302,690 B1 | * | 10/2001 | Brandhorst | A61C 9/0006 433/41 |

(Continued)

*Primary Examiner* — Nicholas D Lucchesi
(74) *Attorney, Agent, or Firm* — Terry M. Crellin

(57) ABSTRACT

An improvement in an articulation system for use in forming a dental model which includes a ridged first leg and a second leg which is formed in the shape of a flat plate having sufficient thickness to be substantially rigid but which also allows limited torsional movement or bending about its longitudinal length as well as limited flexing about its longitudinal length.

3 Claims, 4 Drawing Sheets

(56) References Cited

U.S. PATENT DOCUMENTS

| | | | | |
|---|---|---|---|---|
| 6,402,512 B1* | 6/2002 | Van Valey | ............ | A61C 11/02 |
| | | | | 433/64 |
| 6,511,318 B2* | 1/2003 | Kim | ............ | A61C 9/002 |
| | | | | 433/64 |
| 6,948,932 B2* | 9/2005 | Jung | ............ | A61C 11/00 |
| | | | | 433/57 |
| 7,147,465 B2* | 12/2006 | Jung | ............ | A61C 11/00 |
| | | | | 433/57 |
| 8,459,995 B1* | 6/2013 | Aronov | ............ | A61C 11/08 |
| | | | | 433/213 |
| 11,364,100 B1* | 6/2022 | Garland | ............ | A61C 9/0006 |
| 2003/0207230 A1* | 11/2003 | Garland | ............ | A61C 9/002 |
| | | | | 433/34 |
| 2004/0131990 A1* | 7/2004 | Doviack | ............ | A61C 11/02 |
| | | | | 433/58 |
| 2004/0166465 A1* | 8/2004 | Honstein | ............ | A61C 9/002 |
| | | | | 433/57 |
| 2004/0166466 A1* | 8/2004 | Honstein | ............ | A61C 9/002 |
| | | | | 433/57 |
| 2006/0228665 A1* | 10/2006 | Garland | ............ | A61C 11/02 |
| | | | | 433/60 |
| 2008/0026341 A1* | 1/2008 | Garland | ............ | A61C 9/00 |
| | | | | 433/34 |
| 2013/0149661 A1* | 6/2013 | Yoo | ............ | A61C 11/025 |
| | | | | 433/57 |
| 2014/0080088 A1* | 3/2014 | Kim | ............ | A61C 9/002 |
| | | | | 433/57 |

* cited by examiner

DENTAL TRAY AND ARTICULATOR

This application is a divisional application of non-provisional application Ser. No. 16/746,918 filed on Jan. 19, 2020, which in turn was a continuation of provisional application No. 62/804,118 filed on Feb. 11, 2019.

BACKGROUND OF THE INVENTION

Field of the Invention

The present invention relates generally to apparatus used in making a dental model from a dental impression whereby the patient's teeth are accurately replicated in the dental model. In particular, the present invention relates to novel improvements in trays used in casting the dental models and articulation systems used in association with the trays and the models which are cast in the trays.

State of the Art

In order to fabricate a dental prosthetic, such as a crown, inlay, bridge, etc., a negative impression of a patient's teeth is taken using an impression material, and a reproduction of the impression is made as a model in the dental laboratory. The reproduction is a solid, positive model or replication of the gums and at least several adjacent teeth in the mouth of the patient. It is necessary to support the replication or dental model on an articulation device to determine proper size, fit and movement of the restorative prosthetic relative to the other teeth of the patient.

The process of forming dental models is widely known and is described in U.S. Pat. No. 5,207,574 and will not be repeated here. Generally, the reproduction of the patient's teeth corresponding to the upper and lower teeth are formed in separate casting steps. The models of the respective upper and lower teeth are then affixed to an articulation device during the preparation of a restorative prosthetic.

Tray and articulation systems to which the present invention is closely related are shown in U.S. Pat. Nos. 5,846,076; 5,913,681; and in particular my previous U.S. Pat. No. 8,087,933. In U.S. Pat. No. 5,846,076 a tray is shown having a bottom wall and side walls that extend upwardly from the perimeter of the bottom wall to form an open-topped cavity into which dental casting material is poured. The tray is made of elastomeric material so that the tray can be easily removed from the cast model that is formed in the tray. The tray after being stripped from the cast model is then discarded.

In U.S. Pat. No. 5,913,681 a tray is provided that includes a base wall and upwardly extending side walls at the perimeter of the base wall similar to that of U.S. Pat. No. 5,846,076. However, the tray of U.S. Pat. No. 5,913,681 is formed as a single piece from a nonelastomeric, rigid material, and the cast model must be excised with some difficulty from the tray.

In my previous U.S. Pat. No. 8,087,933 a tray is made of a rigid polymeric material and has (1) a substantially planar base with upstanding side walls integrally attached at the perimeter of the planar base by an easily ripped or torn, frangible membrane or thin film type connector mechanism that integrally connects the lower edge or perimeter of the side walls to the planar base; (2) an articulation system which includes an ell-shaped extension that extends from each of the trays. The distal ends of the ell-shaped extensions have a telescopic type attachment such that the end of one extension can be connected to the end of the other extension whereby the extensions can be pivotally rotated relative to each other about the common axis of the telescopic type attachment.

In another of my previous U.S. Pat. No. 7,425,129 a centric stop mechanism is disclosed and claimed which is attached to the dental model. The centric stop mechanism includes means for adjusting or fine tuning the final vertical positioning of the upper and lower base stones of the dental model. The centric stop mechanism prevents the base stones of a dental model from being moved to an improper position that might otherwise be allowed by improper up and down type flexing of the legs of the associated articulation member.

OBJECTIVES AND BRIEF DESCRIPTION OF THE INVENTION

The principal objective of the invention is to provide several novel improvements in prior art trays that are made of a rigid polymeric material similar to those described in my U.S. Pat. Nos. 7,425,129 and 8,087,933. One improvement consists of providing a substantially planar, relatively thin, ribbon-like extension or flange integrally attached to the upper edge of the upstanding, circuitous side wall so as to provide a relatively narrow table-like surface extending from and around the upper side edges of the upstanding, circuitous side wall, whereby the ribbon-like extension or flange and the upstanding circuitous side walls are removed from the tray by ripping or tearing them from the perimeter of the planar base of the trays using the frangible membrane or thin film type connector mechanism that integrally connects the lower edge or perimeter of the upstanding side walls to the planar base.

A second improvement provides a pair of spaced apart, substantially flat ears that project outwardly from the ribbon-like extension or flange, so that the flat ears extend obliquely outwardly from the front of the tray. Each of the ears are adapted to form a stable flat surface to support wet dental casting material during the procedure of casting and forming a dental model. By including the two respective ears in the tray of this invention, the tray is universal in its ability to be used with either right or left radius quadrant impressions in forming a prosthetic device such as an inlay, crown or bridge.

A third improvement provides an alignment pin that extends upwardly from and perpendicular to the planar base of the tray. The alignment pin is integrally attached to the planar base near the distal end of the tray and is of sufficient length to extend well into an opening corresponding to a distal tooth at the distal end of an quadrant impression when the impression is filled with casting material and assembled on the tray in the process of casting a model of the impression. The alignment pin can be tapered so as to diminish in its cross-sectional size from its end attached to the planar base to its upper free end.

A fourth improvement provides a modification to the centric stop mechanism in which the cylindrical hollow post forming the centric stop is provided with a thin membrane covering over the otherwise open end of the post. The membrane prevents wet material used in casting a dental model from entering and lowing into the cylindrical cavity of the post during casting of a dental model.

A fifth improvement provides a novel modification of the articulation systems disclosed in the prior art and in particular shown in U.S. Pat. Nos. 5,913,681 and 5,847,076. The articulation system of the present invention includes a ridged first leg that is substantially rectilinear and extends from one of the trays used in making the dental model. The other tray has a second leg extending therefrom which is formed in the shape of a flat plate having sufficient thickness to be substantially rigid but which also allows limited torsional movement or bending about its longitudinal length as well as limited flexing about its longitudinal length. The two distal ends of the first and second legs are removably attached such that the first and second legs can be pivotally rotated relative to each other about a common axis that lies in a plane that is substantially perpendicular to the longitudinal axes of the two trays to which the first and second legs are attached.

This allows the dental models formed on the trays to be moved in three distinct movements. The first movement being toward and away from each other, the second movement being from side to side, and the third movement utilizing the limited flex movement of the curved leg to replicate condyle angle during protrusive and lateral protrusive movement of the human jaw.

Additional objects and features of the invention will become apparent from the following detailed description taken together with the accompanying drawings.

THE DRAWINGS

Preferred embodiments of the present invention representing the best mode presently contemplated of carrying out the invention are illustrated in the accompanying drawings in which.

DETAILED DESCRIPTION OF THE PREFERRED EMBODIMENTS

Figure 1:
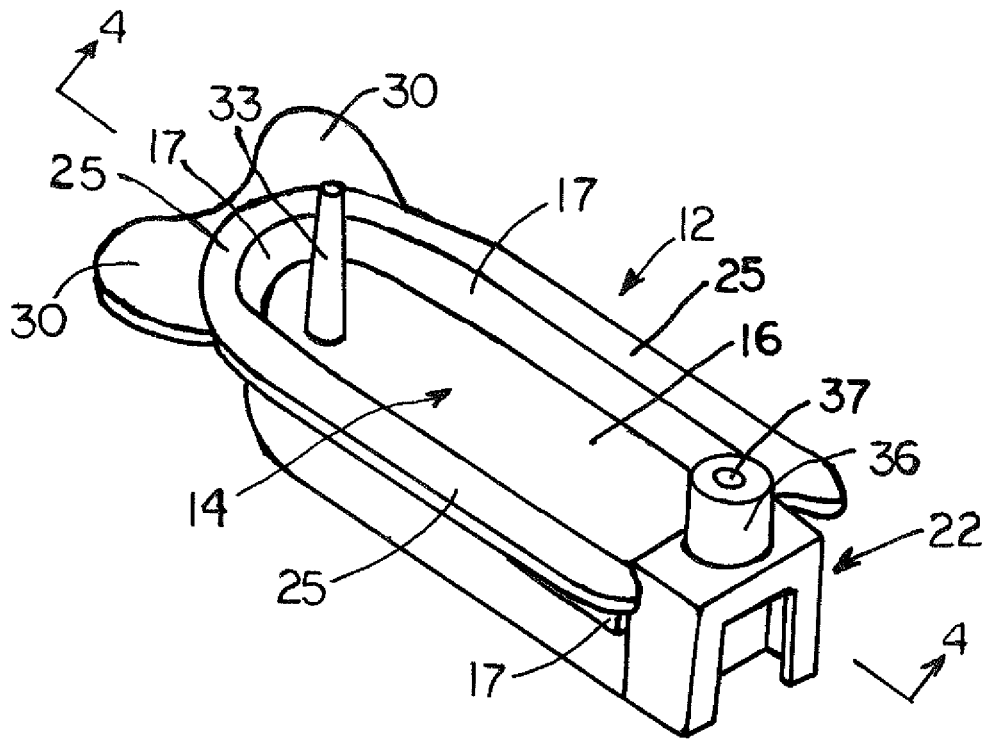
FIG. 1 is a pictorial representation of a dental model tray in accordance with the present invention.

As mentioned previously, the present invention relates generally to apparatus used in making a dental model from a dental impression whereby the patient's teeth are accurately replicated in the dental model. Following is a detailed description of the basic elements of such apparatus as are known in the prior art along with the improvements of the present invention. The improvements in such prior art apparatus will be expressly noted in following the description of the basic prior art apparatus.

Dental trays 12 and a corresponding articulation system or articulator 42 are shown in the drawings. As is well known in the art each of the dental trays 12 is made entirely of a polymeric material and has a substantially planar base 16, a back wall 22 and a circuitous side wall 17. The back wall 22 and circuitous side wall 17 extend upwardly substantially perpendicular to the upper face of the planar base 16 from perimeter edges of the planar base 16 so as to form a cavity 14 having an open top facing upwardly from the planar base 16, whereby dental casting material is poured into the cavity 14 in the process of forming the dental model. The trays 12 are used in pairs as is conventional in the dental modeling art.

Figure 2:
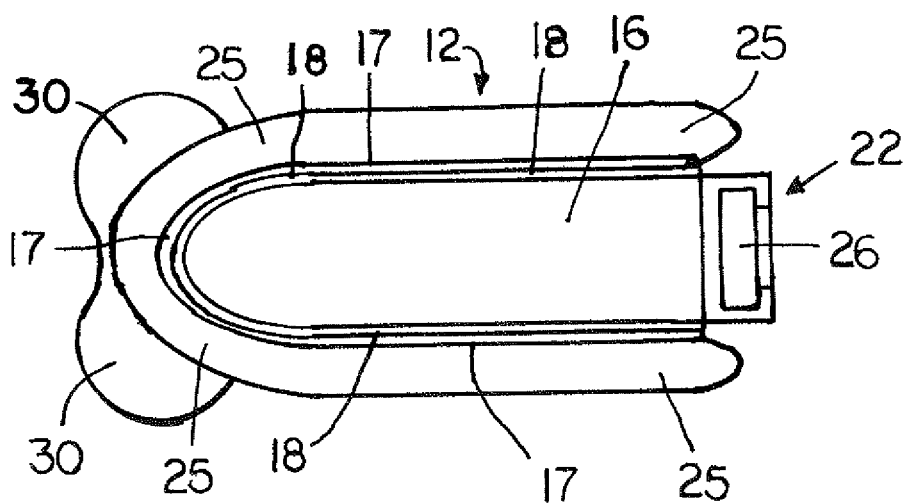
FIG. 2 is a bottom view of a dental tray of FIG. 1, with the means for connecting the side wall to the base of the tray being a continuous thin membrane.
Figure 3:
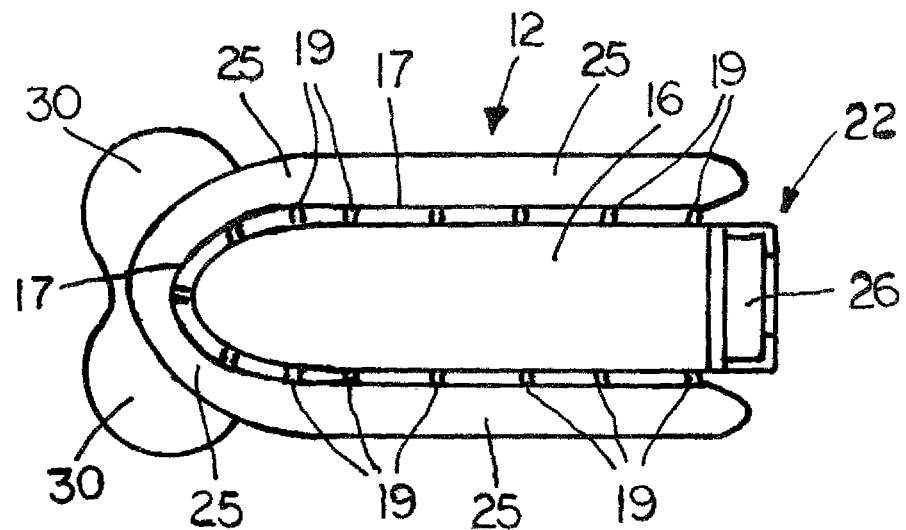
FIG. 3 is a bottom view similar to that of FIG. 2, with the means for connecting the side wall to the base of the tray being formed into space apart thin tabs instead of a continuous thin membrane.

The back wall 22 is formed integrally attached to the respective perimeter portion of the planar base 16 from which it extends. The side wall 17 can be formed integrally attached to the respective portion of the perimeter of the planar base 16 from which it extends, however, in a preferred embodiment of the invention the side wall 17 is preferably attached to the planar base 16 by a thin membrane 18 (FIG. 2) that is formed integrally with both the side wall 17 and the respective portion of the perimeter of the planar base 16 from which the side wall 17 extends. The thin membrane 18 is preferably, but not necessarily, perforated so as to comprise a plurality of spaced apart relatively thin tabs 19 (FIG. 3). The thin membrane 18 or tabs 19 are made relatively thin so that they are frangible and can easily be broken, whereby the side wall 17 can be ripped or torn from the planar base 16 after the dental casting material has hardened in the tray 12 to remove the side wall 17 from the planar base 16 when such is desired.

A novel improvement to the tray 12 in accordance with the present invention is to provide a substantially planar, relatively thin, narrow flange 25 integrally attached to the upper edge of the upstanding circuitous side wall 17 of the tray 12 so that the flange 25 extends outwardly substantially perpendicular from the upper side edge of the upstanding circuitous side wall 17. The flange 25 has been quite fortuitously found to provide a relatively narrow, table-like surface extending from and around the upper side edge of the upstanding circuitous side wall 17. The table-like surface advantageously forms an ideal, stable, working surface which greatly accommodates a dental technician in properly placing an impression filled with wet casting material on the tray 12. It has further been advantageously found that the upstanding circuitous side wall 17 including the flange 25 extending therefrom can be easily removed from the tray 12 by ripping or tearing them from the perimeter of the planar base 16 of the tray 12, and that even further there is less cleanup of solidified casting material from the resulting dental model when the flange 25 is provided on the upstanding side walls 17.

A second improvement provides a pair of spaced apart, substantially flat, ears 30 extending outwardly from the flange 25 at the front of the tray 12, wherein the ears 30 are formed integrally with the flange 25 such that the ears 30 form flat, coplanar projections extending outwardly from the flange 25. The ears 30 further extend obliquely outwardly from the front end of the tray 12, i.e., the free end of the tray 12 that is not adapted to be attached to an articulation mechanism. The ears 30 extend obliquely whereby the respective center lines of the extending ears 30 make an angle of about 45 degrees (plus or minus 2 or 3 degrees) with the longitudinal center line of the tray 12. Each of the ears 30 has a flat upper surface that is substantially coplanar with the upper surface of the flange 25. The ears 30 provide a stable, flat platform for supporting wet casting material contained in the curved end of an impression.

If the impression is a right quadrant impression, the wet casting material contained in the curved front end of the impression is supported by one of the ears 30, and if the impression is a left quadrant impression, the wet casting material is supported by the opposite ear 30. The curved end of the resulting dental model, whether a left or right quadrant, is formed integral with the main body of the dental model, and, as explained above, is supported by one of the ears 30 as the casting material hardens. After the dental casting material has set or hardened, the upstanding side walls 17 including the flange 25 and the ears 30 on the tray 12 can be pulled away from the sides of the model and ripped or torn from the perimeter of the planar base 16 of the tray 12, whereby the resulting dental model has one end that curves either to the left or right depending upon whether the dental model was made using a left or right quadrant impression. By including the two respective ears 30 in the tray 12 of this invention, the tray 12 is thus universal in its ability to be used with either right or left radius quadrant impressions.

In preparing a dental model the technician must fill one side of an impression with casting material and then impress that filled side down on the open end of the open-topped cavity 14 so as to fill the open-topped cavity 14 with wet casting material. The technician must align the longitudinal center of the impression with the corresponding longitudinal center of the open-topped cavity 14. That is rather difficult and many times the advantageous centering of the impression on the opentopped cavity 14 is not achieved which then makes the technician adjust for such miss-centering when using the tray during subsequent steps in the making of the desired dental model.

Figure 4:
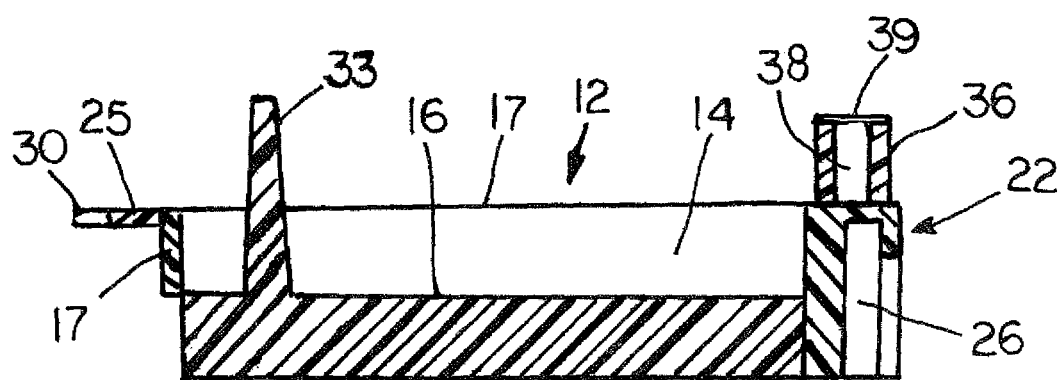
FIG. 4 is a vertical cross-section taken along the longitudinal center line 4-4 of the tray of FIG. 1.

Another significant improvement in the tray 12 in accordance with the present invention which allows the technician to quickly and accurately position the impression filled with wet casting material on the tray 12 comprises an alignment pin 33 (FIGS. 1, 4 and 5) that extends upwardly from and perpendicular to the planar base 16 of the tray 12. The alignment pin 33 is integrally attached to the planar base 16 near the front end of the tray 12 and is of sufficient length to extend well into an opening corresponding to an individual tooth impression at the front end of a quadrant impression when the impression is filled with casting material and assembled on the tray in the process of casting a model of the impression. The alignment pin 33 can be tapered so as to diminish in its cross-sectional size from its end attached to the planar base 16 to its free upper end. When the quadrant impression containing the wet casting material is placed on the open-topped cavity 14 of the tray 12, the technician simply places the impression so that the alignment pin 33 enters a corresponding individual tooth impression of the quadrant impression. Then the technician presses the quadrant impression and wet casting material firmly down on the open-topped cavity 14 of the tray 12.

A centric stop means is provided with most prior art systems wherein adjustment of the limit of occlusion movement of the dental model is possible. One advantageous embodiment of prior art centric stop means comprises an upstanding stop member 36 (FIGS. 1, 4 and 5) extending upwardly from the back end of the tray 12 such that in use with an articulation mechanism the stop members 36 of the respective trays 12 being used face each other and approach each other during closing of the occlusion movement. The stop members 36 are advantageously formed as hollow cylindrical legs 37, and a screw (not shown in the drawings) is screwed into the hollow leg 37 of one of the trays 12. The screw can be screwed further into or out of the hollow leg 37 such that engagement of the screw with the free end of the leg of the opposing tray 12 can be adjusted thereby limiting the downward movement of the trays 12 during closing of the occlusion movement.

Unfortunately wet casting material often enters and flows down into the cylindrical cavity 38 (FIG. 4) of the hollow member 36 during casting of a dental model. The resulting hardened, solidified casting material thus formed in the cylindrical cavity 38 greatly hinders the adjustment screw or other similar tool from being screwed into the cylindrical cavity 38 during further use of the dental model. In accordance with the improvements of the present invention, a membrane 39 (FIG. 4), advantageously made of the same material as the tray 12, is formed integrally with the hollow member 36. The membrane 39 forms a thin cover over the otherwise open end of the hollow member 36. The membrane 39 prevents wet casting material from entering the cylindrical cavity 38 and thus insures that hardened, solidified casting material can not be formed in the cylindrical cavity 38. The membrane 39 is advantageously formed so as to have a dimpled, concave shape which greatly accommodates positioning the tip end of the screw in proper position so that the tip of the screw can penetrate the membrane 39 and allow the screw to enter the cylindrical cavity 38 of the hollow member 36.

The trays 12 are conventionally used in combination with an articulation system 42 (FIGS. 5-8) which is used to hold two trays 12 and dental models formed thereon so that the replications of the person's teeth can be pivoted in an articulation movement to simulate the occlusion of the upper teeth with the lower teeth. An improvement in such an articulation systems 42, in accordance with the present invention, and as shown in the drawings, include novel legs 44 and 45 that are fundamentally different in their shape, form and operation from similar members of prior art articulation systems 42. The articulation systems 42 of the prior art as well as the present one provide proper occlusion of the upper and lower teeth of the dental model, but only the improvement in accordance with the present invention provides replication of the condyle angle or condylar path and movement during protrusive and lateral protrusive movement of the human jaw.

Figure 5:
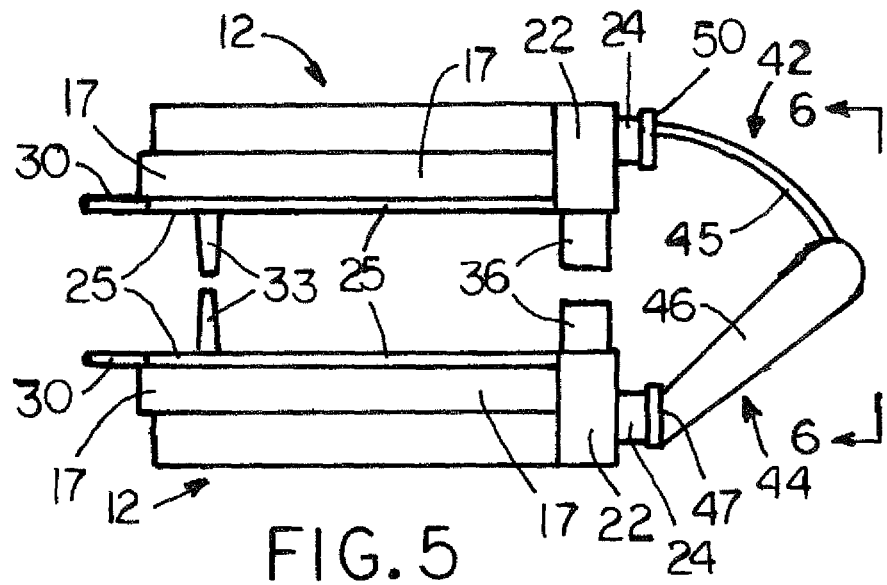
FIG. 5 is a side elevation of two trays of the present invention being associated with an articulator to show the interrelationship of the trays and associated articulator when they are being used in making a dental model.
Figure 6:
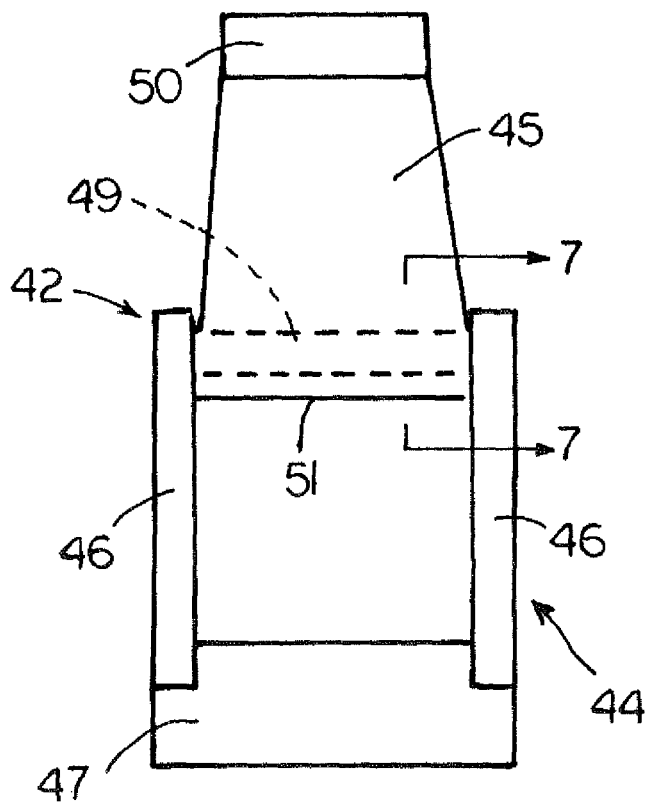
FIG. 6 is an end elevation of the articulator member of FIG. 5 taken along line 6-6 of FIG. 5.
Figure 7:
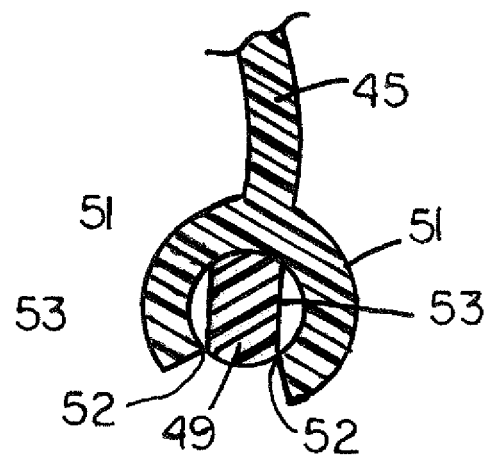
FIG. 7 is a cross-section taken along line 7-7 of FIG. 6 such that the cross-section is through the interconnection of the free end of the curved flat plate and the circular shaped connector that forms the free end of the rectangular shaped member.
Figure 8:
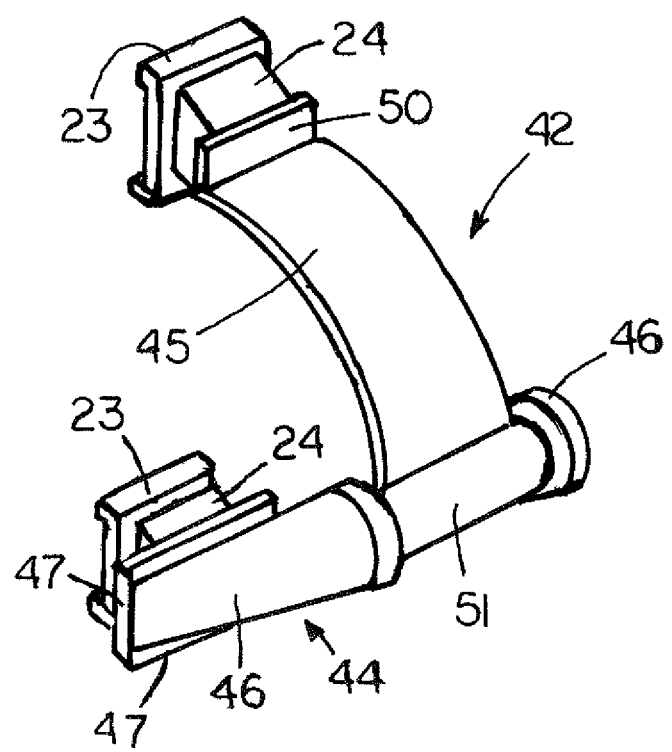
FIG. 8 is a pictorial representation of a preferred embodiment of the articulator.

As shown in FIG. 5 of the drawings, a pair of trays 12 are used together with the articulation system 42 in making a dental model. The improvement in the articulation system 42 of the present invention as shown in FIGS. 5-8 of the drawings comprises a substantially rigid, generally rectangular shaped leg member 44 that extends from the back wall 22 of first tray 12 of the pair of trays 12 and a rigid flat leg member 45 having the shape of a substantially flat plate that extends from the back wall 22 of a second tray 12 of the pair of trays 12. The flat leg member 45 can have a linear longitudinal axis so as to have an essentially planar, shape, but in a preferred embodiment as illustrated, the flat leg member 45 is curved along its longitudinal direction. The otherwise free ends of the rectangular shaped leg member 44 and the flat leg member 45 are removably attached to each other so that the flat leg member 45 is secured firmly in place to the end of the rectangular shaped leg member 44 but can also pivot about a longitudinal axis through its end that is attached to the end of the rectangular shaped leg member 44.

The rectangular shaped leg member 44 as illustrated comprises two elongate, rigid, substantially planar beams 46 that form opposite sides of the rectangular shaped leg member 44. Proximal ends of the planar beams 46 are interconnected by a flat, substantially rigid connector 47 that extends between respective ends of the planar beams 46 and forms a proximal end of the rectangular shaped leg member 44. The ends of the rigid connector 47 are securely attached to respective ends of the planar beams 46 such that when the flat connector 47 is firmly attached to the back wall 22 of the respective tray 12, the planar beams 46, and thus the rectangular shaped leg member 44, extend outwardly from the back wall 22 and upwardly from the planar base 16 of the tray 12 so as to make an acute angle of from somewhere between about 40 and 50 degrees with the back wall 22 and planar base 16 of the tray 12. The distal ends of the planar beams 46 are connected by a substantially rigid circular shaped second connector 49 (FIGS. 6 and 7) that has the form of an elongate solid cylinder. The opposite ends of the second connector 49 are firmly attached to the respective distal ends of the planar beams 46 to thereby form the distal end of the rectangular shaped leg member 44.

The flat leg member 45 is attached at its proximal end to a flat member 50 (FIGS. 5, 6 and 8) that is in turn attached firmly to the back wall 22 of a respective second tray 12 of the pair of trays 12 being used, with the flat leg member 45 extending outwardly from its respective tray 12 so that the distal end of the flat leg member 45 abuts the distal end of the rectangular shaped leg member 46 extending from the respective second tray 12 of the pair of trays 12 being used. The pivotal attachment of the two respective distal ends of the rectangular shaped leg member 44 and the flat leg member 45 advantageously comprises a hollow cylindrical receiving member 51 (FIGS. 6 and 8) formed longitudinally along the distal end of the flat leg member 45. The hollow cylindrical receiving member 51 has a longitudinal slot 52 (FIG. 7) extending along is length. The solid cylindrically shaped second connector 44 that forms the distal end of rectangular shaped leg member 44 has a pair of flat surfaces 53 (FIG. 7) formed longitudinally along its opposite longitudinal sides so that the dimension between the opposed flat surfaces 53 is slightly less than the diameter of the remaining cylindrical portion of the second connector 49. Further, the dimension between the opposed flat surfaces 53 is slightly less than the width of the longitudinal slot 52 in the cylindrical receiving member 51, and the diameter of the cylindrical portion of the second connector 49 is slightly less than the diameter of the hollow receiving member 51.

The rectangular shaped leg member 44 and the flat leg member 45 can each be formed integrally with the back side edge of the bottom wall 16 or the back, exposed side of the back wall 22, but as shown in the drawings, it is preferable to make the rectangular shaped leg member 44 and the flat leg member 45 as distinct, separate pieces that are removably attached to the back wall 22. The back wall 22 provides structure to which the rigid rectangular shaped leg member 44 and the flat leg member 45 are firmly attached. In the embodiment of the invention as shown in the drawings, the proximal ends of the rectangular shaped leg member 44 and the flat leg member 45 are each integrally formed to a respective slide block 24 (FIGS. 5 and 8) which is adapted to be received in sliding manner within a slot-like opening 26 (FIGS. 2,3 and 4) in the back wall 22. As illustrated, an upwardly extending opening 26 is formed in the back wall 22 extending upwardly from the bottom of the back wall 22 to near the top of the back wall 22. The back wall 22 is of sufficient thickness to accommodate the slot-like opening 26 which is in turn of sufficient thickness to receive the slide portion 23 (FIG. 8) of slide block 24 in sliding movement within the slot-like opening 26. The slot-like opening 26 is open at its bottom side on the bottom of the back wall 22, and the top of the back wall forms a stop surface at the inside top of the opening 26.

The slide block 24 is sized so as to make a snug, semi-tight to tight fit within the slot-like opening 26 as the slide portion 23 of the slide block 24 slides upwardly through the open end of and into the slot-like opening 26. When the upper end surface of slide portion 23 of the block 24 engages the stop surface, i.e., the top surface of the slot-like opening 26, the respective rectangular shaped leg member 44 and flat leg member 45 are positioned in their correct position and the tightness of the fit between the block 24 and the slot-like opening 26 holds them securely in their correct position.

As mentioned briefly hereinbefore, the improved articulation 42 of the present invention provides or allows replication of the condyle angle or condylar path during protrusive and lateral protrusive movement of the human jaw. Referring to FIG. 5, when in use the model of the upper teeth (not shown) are formed on the upper tray 12 and the model of the lower teeth (not shown) are formed on the lower tray 12. With the trays 12 and articulation system in their position as shown in FIG. 5, the respective model of the upper teeth and the model of the lower teeth would be in their closed occlusion position. To replicate the condylar movement of the human mouth, the articulation system 42 must allow movement of the teeth of the two models mounted on the articulation system 42 in a substantially similar motion of teeth in a human mouth. It is noted that the human mouth has upper teeth held firmly in a fixed unmovable state by the bone structure from which they project. The lower teeth of the human mouth are firmly attached to the jaw bone. The jaw bone can pivot to open and close the mouth. The jaw bone can also move forward into protrusive movement in which the teeth initially move downwardly along the condylar path or angle so that the upper and lower teeth disengage or open apart and then the jaw can move the lower teeth further forward in a protrusive movement.

As can be seen referring again to FIG. 5, when the upper tray 12 including a dental model of the upper teeth is held firmly and the lower tray 12 including a corresponding dental model of the lower teeth is pushed forward in simulating protrusive movement, the flat leg member 45 flexes to allow the forward movement but also forces the lower tray and dental model to initially move downwardly in a motion closely replicating the condylar path or angle achieved by the jaw of a human. The teeth in the lower tray 12 initially move downwardly in a motion replicating the condylar path or angle so that the teeth in the dental models of the upper and lower trays 12 disengage or open apart to allow teeth in the lower tray 12 to move forward in a protrusive movement.

It should be noted that the flat leg member 45 could be flat or straight along its longitudinal length instead of being curved as in the embodiment illustrated in the drawings. A flat leg member 45 which has a straight longitudinal shape rather than a curved longitudinal shape would produce the same movement as that described for the curved flat leg member 45.

The invention claimed is:

1. I claim an improvement in an articulation device used with a pair of trays in the dental art for forming a dental model in which said articulation device includes first and second leg members having respective first and second ends, with said first ends being securely attached to respective ends of each of said pair of trays, and wherein means are provided for removably and pivotally attaching said second ends to each other such that said first and second leg members can be detached from each other when desired and can further be pivotally rotated relative to each other about a common axis that lies in a plane that is substantially perpendicular to longitudinal axes of said pair of trays to which said first and second leg members are attached, wherein said improvement in said articulation device comprises:

said first leg member has a substantially rigid, substantially rectangular shape; and said second leg member has the shape of a flat plate having sufficient thickness to be substantially rigid but which also allows limited torsional movement about its longitudinal length as well as limited flexing about its longitudinal length; whereby said improvement in said articulation device allows normal occlusive movement and lateral side to side movement of dental models formed on said trays as well as a protrusive movement of said dental models to replicate condylar movement during protrusive and lateral protrusive movement of a human jaw.

2. I claim the improvement in said articulation device in accordance with claim 1 wherein said first leg member comprises:

two elongate, rigid planar beams that form opposite sides of said first leg member;

proximal ends of said planar beams are interconnected by a substantially rigid first connector member that extends between respective proximal ends of said planar beams and forms said first end of said first leg member;

distal ends of said planar beams are interconnected by a substantially rigid second connector and forms said second end of said first leg member; and further wherein said means for removably and pivotally attaching said second ends of said first and second leg members comprises:

a hollow cylindrical receiving member formed longitudinally along said second end of said second leg member wherein said hollow cylindrical receiving member has a longitudinal slot extending along its length;

said second connector of said first leg member has the form of an elongate solid cylinder; whereby said second connector of said first leg member can be received into as well as removed from said hollow cylindrical receiving member of said second leg member through said longitudinal slot in said hollow cylindrical receiving member.

3. I claim the improvement in said articulation device in accordance with claim 1 wherein said second leg member has a curved shape along its longitudinal length.

* * * * *